(12) United States Patent
Katano

(10) Patent No.: US 7,325,203 B2
(45) Date of Patent: Jan. 29, 2008

(54) CONFIGURING A GRAPHICAL USER INTERFACE ON A MULTIFUNCTION PERIPHERAL

(75) Inventor: Seiichi Katano, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 774 days.

(21) Appl. No.: 10/639,004

(22) Filed: Aug. 11, 2003

(65) Prior Publication Data

US 2005/0039125 A1 Feb. 17, 2005

(51) Int. Cl.
*G06F 17/00* (2006.01)
(52) U.S. Cl. ............ 715/765; 715/735; 715/745; 715/747; 709/219; 710/1; 710/8
(58) Field of Classification Search ........ 715/700, 715/762–765, 734–747; 710/1, 8; 709/219
See application file for complete search history.

(56) References Cited

U.S. PATENT DOCUMENTS

| | | | | |
|---|---|---|---|---|
| 5,548,782 | A * | 8/1996 | Michael et al. ........... 710/15 |
| 5,586,025 | A * | 12/1996 | Tsuji et al. ............... 715/500 |
| 6,133,847 | A | 10/2000 | Yang |
| 6,266,693 | B1 * | 7/2001 | Onaga ...................... 709/219 |
| 6,725,300 | B1 * | 4/2004 | Nagasaka et al. .......... 710/62 |
| 6,850,253 | B1 | 2/2005 | Bazerman et al. |
| 6,993,558 | B2 * | 1/2006 | Yokokura ................. 709/203 |
| 2002/0097262 | A1 * | 7/2002 | Iwase et al. .............. 345/744 |
| 2003/0011633 | A1 * | 1/2003 | Conley et al. ............ 345/762 |
| 2003/0163628 | A1 * | 8/2003 | Lin ........................... 710/315 |
| 2003/0195917 | A1 | 10/2003 | Horiyama et al. |
| 2003/0204591 | A1 * | 10/2003 | Ueda et al. ............... 709/224 |
| 2003/0204841 | A1 * | 10/2003 | Nakane et al. ............ 717/170 |
| 2004/0048621 | A1 * | 3/2004 | Takahashi et al. ...... 455/456.3 |
| 2004/0145767 | A1 * | 7/2004 | Endo et al. ............... 358/1.13 |
| 2004/0184108 | A1 * | 9/2004 | Takano ..................... 358/400 |
| 2004/0212823 | A1 * | 10/2004 | Chavers et al. .......... 358/1.15 |
| 2005/0007337 | A1 * | 1/2005 | Sellen et al. .............. 345/156 |
| 2005/0039126 | A1 | 2/2005 | Katano |
| 2005/0190398 | A1 | 9/2005 | Nuggehalli et al. |
| 2006/0248554 | A1 * | 11/2006 | Priddy ...................... 725/25 |

\* cited by examiner

*Primary Examiner*—Tadesse Hailu
(74) *Attorney, Agent, or Firm*—Hickman Palermo Truong & Becker LLP

(57) ABSTRACT

A method and apparatus for customizing a graphical user interface on a multifunction peripheral is provided. User interface specification data is transmitted from a device to the multifunction peripheral. User interface specification data defines a desired display and operation behavior for the user interface. Result data is received at the device from the multifunction peripheral. Result data defines whether the user interface was updated to reflect the user interface specification data. Other aspects provide for copying the graphical user interface from a source multifunction peripheral to a destination multifunction peripheral, scheduling a point in time to update one or more graphical user interfaces to reflect the user interface specification data, and establishing a number of uses to apply the user interface specification data to the one or more user interfaces.

28 Claims, 10 Drawing Sheets

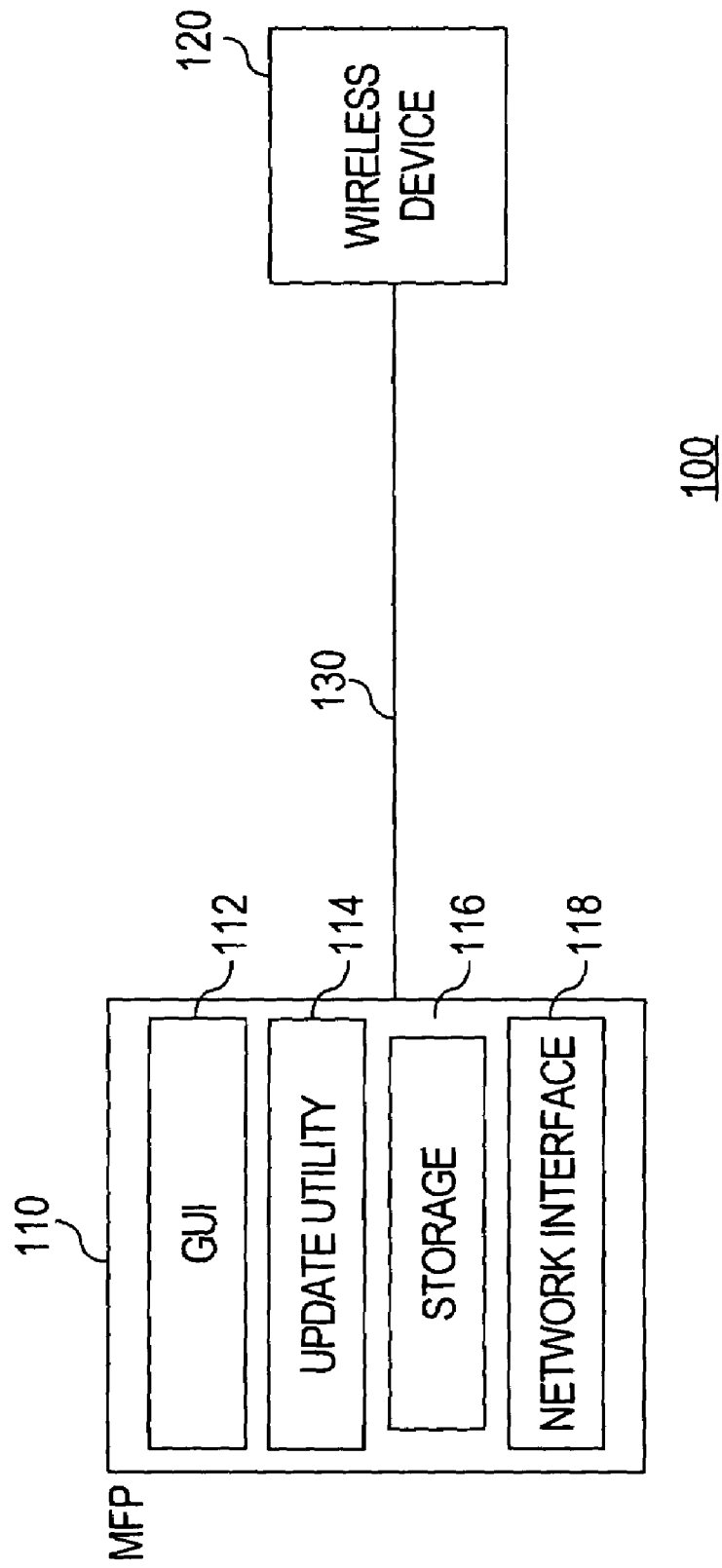

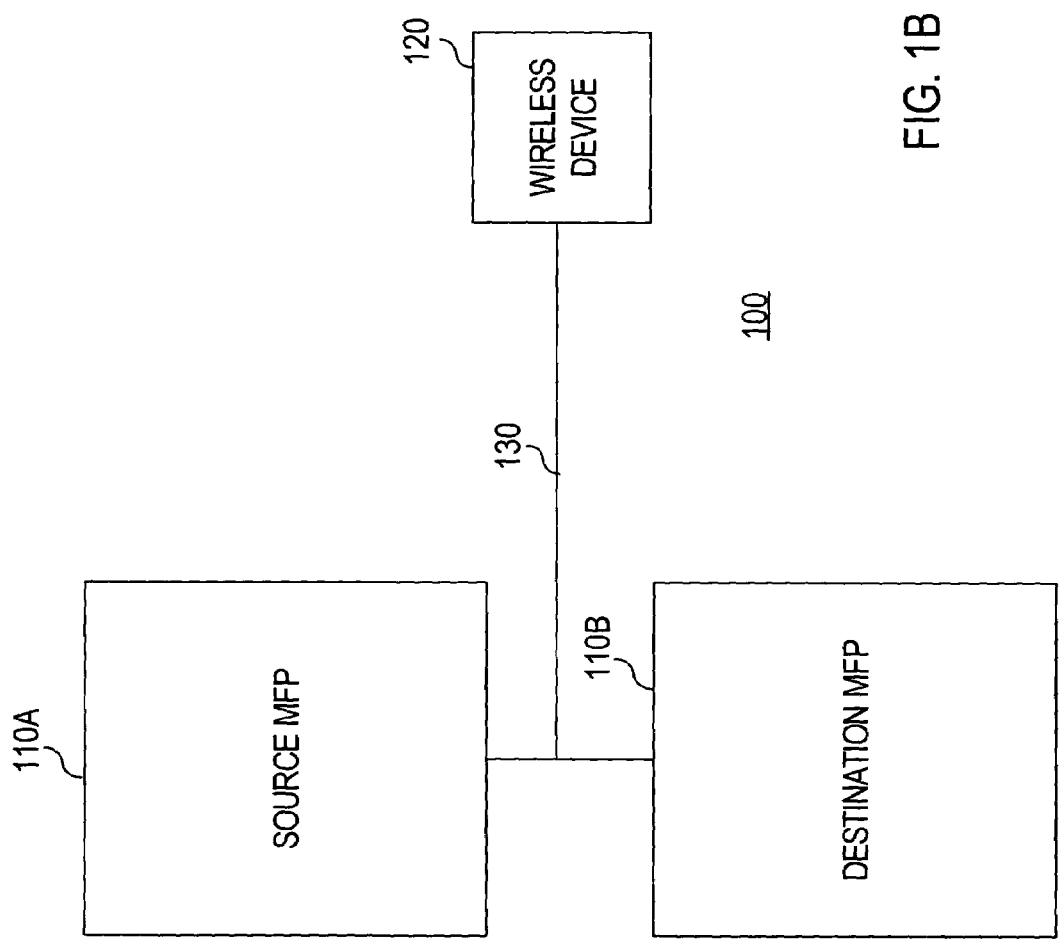

```
IP=172.30.2.178

[WINDOW]
BEGIN
COPY APPLICATION DIALOG  0, 0, 400, 200
    PUSHBUTTON    "Text",IDC_TEXT,4,4,40,10, BUTTON_TEXT
    PUSHBUTTON    "Photo",IDC_PHOTO,44,4,40,10, BUTTON_PHOTO
    PUSHBUTTON    "Text/Photo",IDC_TANDP,4,44,80,10, BUTTON_TANDP
END

[WINDOW]
OUT_PUT DIALOG  200, 0, 100, 100
BEGIN
    PUSHBUTTON    "Total",IDC_TOTAL,4,4,40,10, BUTTON_TOTAL
    PUSHBUTTON    "Copy",IDC_COPY,44,4,40,10, BUTTON_COPY
END
```

810 ─── START=04/15/2003

[WINDOW]
    BEGIN
    COPY APPLICATION DIALOG  0, 0, 400, 200
        PUSHBUTTON    "Text",IDC_TEXT,4,4,40,10, BUTTON_TEXT
        PUSHBUTTON    "Photo",IDC_PHOTO,44,4,40,10, BUTTON_PHOTO
        PUSHBUTTON    "Text/Photo",IDC_TANDP,4,44,80,10, BUTTON_TANDP
    END

[WINDOW]
    OUT_PUT DIALOG  200, 0, 100, 100
    BEGIN
        PUSHBUTTON    "Total",IDC_TOTAL,4,4,40,10, BUTTON_TOTAL
        PUSHBUTTON    "Copy",IDC_COPY,44,4,40,10, BUTTON_COPY
    END
```

TEMPORARY=1
     START=04/15/2003

[WINDOW]
     BEGIN
     COPY APPLICATION DIALOG 0, 0, 400, 200
         PUSHBUTTON    "Text",IDC_TEXT,4,4,40,10, BUTTON_TEXT
         PUSHBUTTON    "Photo",IDC_PHOTO,44,4,40,10, BUTTON_PHOTO
         PUSHBUTTON    "Text/Photo",IDC_TANDP,4,44,80,10, BUTTON_TANDP
     END

[WINDOW]
     OUT_PUT DIALOG 200, 0, 100, 100
     BEGIN
         PUSHBUTTON    "Total",IDC_TOTAL,4,4,40,10, BUTTON_TOTAL
         PUSHBUTTON    "Copy",IDC_COPY,44,4,40,10, BUTTON_COPY
     END

⋮
```

910 braces: TEMPORARY=1, START=04/15/2003
810: [WINDOW]

CONFIGURING A GRAPHICAL USER INTERFACE ON A MULTIFUNCTION PERIPHERAL

RELATED APPLICATION DATA

This application is related to U.S. patent application Ser. No. 10/639,052, filed Aug. 11, 2003, also entitled "Configuring a Graphical User Interface on a Multifunction Peripheral," which is hereby incorporated by reference in its entirety.

FIELD OF THE INVENTION

The present invention relates to configuring a graphical user interface on a multifunction peripheral.

BACKGROUND OF THE INVENTION

A multifunction peripheral (MFP) is a single device that performs several functions. Many MFPs are equipped to perform as printers, scanners, facsimile machines, and copiers. Because they can perform many functions, they are advantageous over their single function counterparts. Moreover, consumers prefer MFPs because purchasing one is often less expensive than separately purchasing a printer, scanner, facsimile machine, and copier. Because of their usefulness and versatility, MFPs are very common in the workplace.

In fact, many companies use MFPs as part of their day-to-day operation. For example, businesses may use the MFPs to print up a report, make copies of the report, send the report to someone else, or even scan a picture to put in the report. From a business perspective, an MFP is valuable because it saves the company money and allows their employees to be more efficient and productive.

Users typically interact with a MFP through a graphical user interface (GUI) displayed on the MFP. The GUI provides a mechanism for the user to submit input that species one or more operations for the MFP to perform. For example, the GUI may display one or more digitally rendered screens that each present buttons or other mechanisms that enable the user to specify one or more operations for the MFP to perform, e.g., a pressure sensitive touch pad screen.

It is desirable to customize the GUI of a MFP to accommodate the specific needs of a user. For example, a user may wish to customize the GUI of a MFP to include graphics, e.g., a corporate logo, or otherwise wish to modify the appearance of the GUI. Alternately, a user may wish to customize the behavior of a MFP to modify the functionality supported by the MFP. However, once a MFP has been deployed at a user site, only the manufacturer of the MFP is able to customize the GUI. In other words, the user is unable to customize the display or operation of the GUI of the MFP.

Accordingly, there is an unaddressed need in the art to enable the customization the appearance or behavior of a GUI of a MFP, and to deploy the customizations in an efficient manner.

SUMMARY OF THE INVENTION

Techniques are provided for transmitting user interface specification data that defines a desired display and operation behavior for a graphical user interface from a device to one or more multifunction peripherals. The graphical user interface is update to reflect the user interface specification data. Thereafter, result data that defines whether the user interface was updated to reflect the user interface specification data is received at the device from the multifunction peripheral.

Other aspects provide for retrieving a first set of user interface specification data that defines a display and operation behavior for the source graphical user interface located at a first multifunction peripheral. A second set of user interface specification data is transmitted to one or more second multifunction peripherals, wherein each of the one or more multifunction peripherals contains a destination user interface, and wherein the second set of user interface specification data is configured to update the one or more destination user interfaces to reflect the first set of user interface specification data.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block network diagram illustrating a configurable MFP system according to a first embodiment of the invention;

FIG. 1B is a block network diagram illustrating a customizable MFP system according to a second embodiment of the invention;

FIG. 5 is a first pictorial representation of user interface specification data according to an embodiment of the invention;

FIG. 8 is a second pictorial representation of user interface specification data according to an embodiment of the invention;

FIG. 9 is a third pictorial representation of user interface specification data according to an embodiment of the invention.

DETAILED DESCRIPTION OF THE INVENTION

A method and apparatus for customizing a user interface on a multifunction peripheral (MFP) is described. In the following description, for the purposes of explanation, numerous specific details are set forth in order to provide a thorough understanding of the present invention. It will be apparent, however, that the present invention may be practiced without these specific details. In other instances, wellknown structures and devices are shown in block diagram form in order to avoid unnecessarily obscuring the present invention.

Architecture Overview

FIG. 1A is a block network diagram illustrating a customizable MFP system 100 according to an embodiment of the invention. The customizable MFP system 100 of FIG. 1A includes a MFP 110, a device 120, and a communications link 130.

MFP 110, as used herein, is broadly used to refer to any multifunction peripheral capable of performing the functionality of two or more of: a printer, a scanner, a facsimile machine, and a copier. For ease of explanation herein, FIG. 1B depicts two MFPs, namely MFP 110A and 110B; however, embodiments of the invention may operate with any number of MFPs, including a single MFP (as shown in FIG. 1A) or two or more MFPs.

Figure 2:
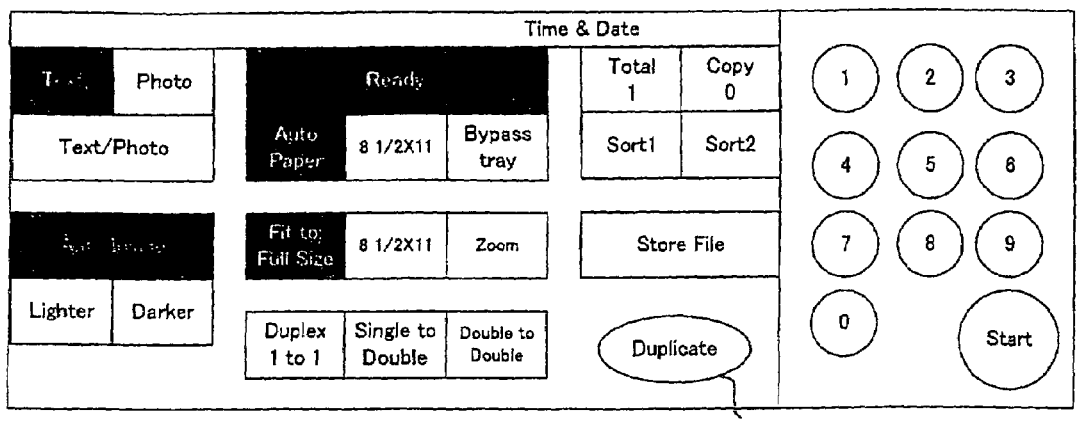
FIG. 2 is a pictorial representation of a first GUI displayed on a MFP according to an embodiment of the invention.
Figure 3:
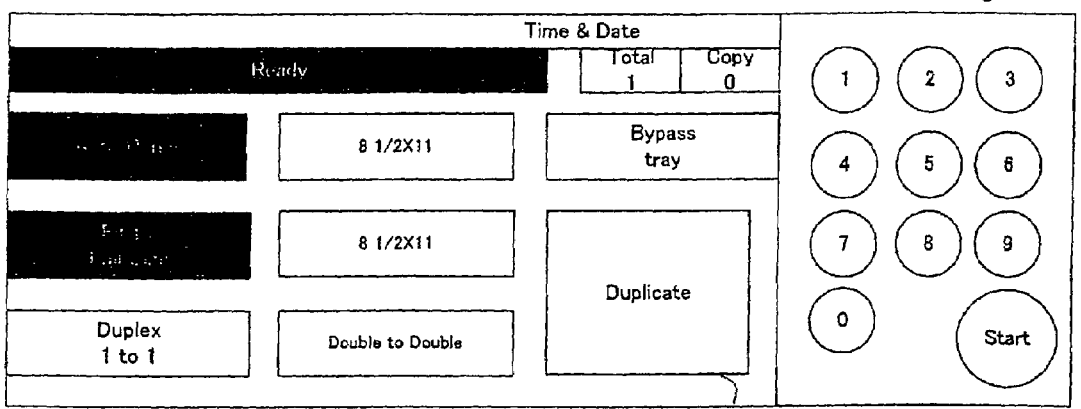
FIG. 3 is a pictorial representation of a second GUI displayed on a MFP according to an embodiment of the invention.

MFP 110 may include a GUI 112, an update utility 114, a storage 116, and a network interface 118. GUI 112, as used herein, is broadly used to refer to any graphical user interface displayed on a MFP that enables a user to specify an operation for the MFP to perform. For example, FIGS. 2 and 3 are pictorial representations of example GUIs displayed on a MFP according to an embodiment of the invention. Update utility 114, as used herein, is broadly used to refer to any computerized device or application that is capable of updating the GUI displayed on a MFP with user interface specification data that is stored in storage 116. Storage 116, as used herein, is broadly used to refer to any mechanism that is capable of storing electronic information, e.g., user interface specification data. Non-limiting illustrative examples of storage 116 include a database, memory, and a file system. Network interface 118, as used herein, is broadly used to refer to any interface that enables a MFP to communicate with communication link 130.

Device 120, as used herein, is broadly used to refer to any computerized device capable of communicating with a MFP. Non-limiting, illustrative examples of device 120 include a laptop computer, a cell phone, a personal digital assistant (PDA), and a wireless device. For ease of explanation, FIGS. 1A and 1B each depict one device 120; however, embodiments of the invention may operate with any number of devices, including a single device 120 or two or more devices 120.

Communications links 130 may be implemented by any medium or mechanism that provides for the exchange of data between MFP 110 and device 120. Examples of communications links 130 include, without limitation, a network such as a Local Area Network (LAN), Wide Area Network (WAN), Ethernet or the Internet, or one or more terrestrial, satellite or wireless links.

Configuring a GUI on a MFP from a Device

Figure 4:
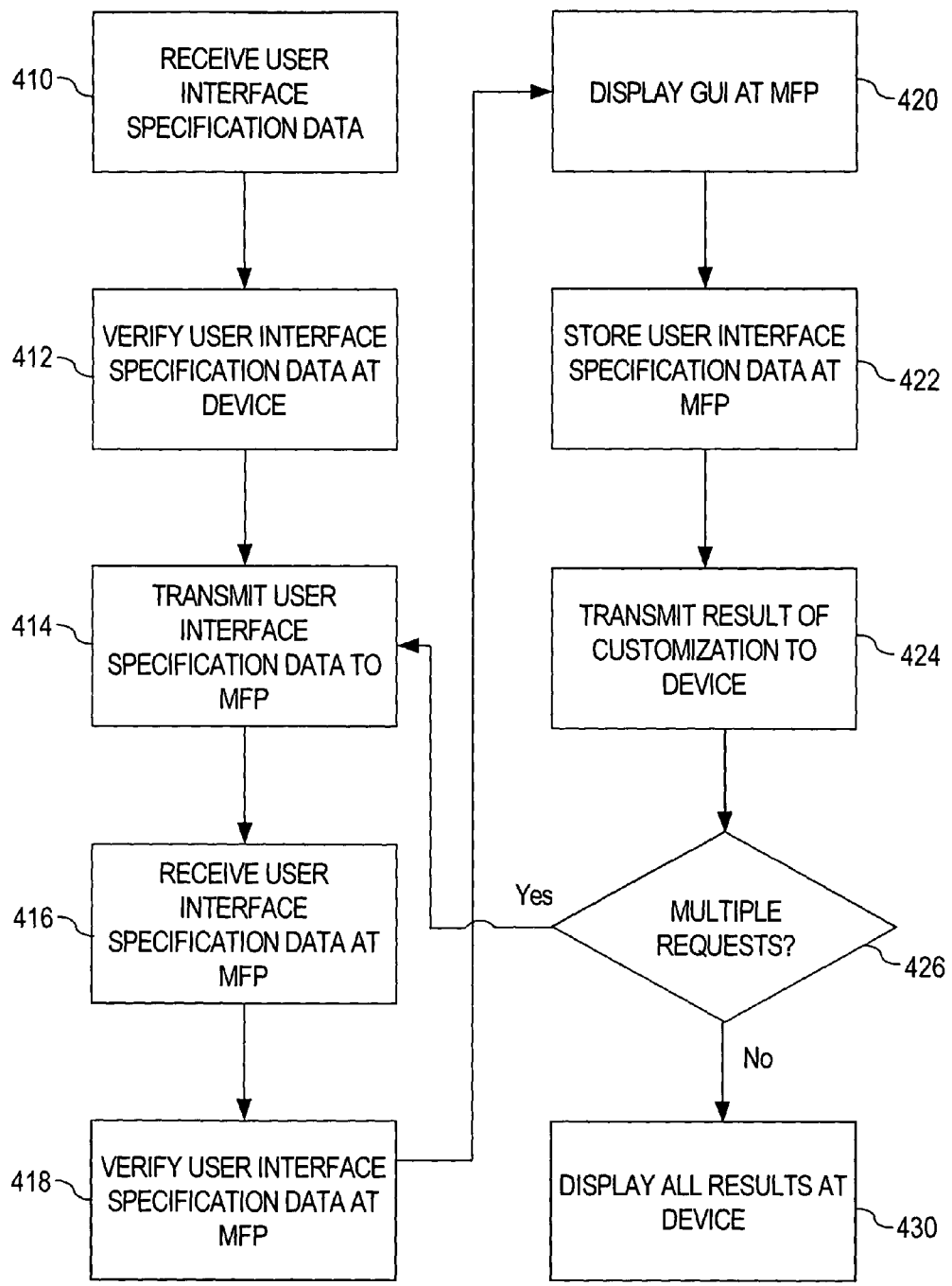
FIG. 4 is a flow chart illustrating the functional steps of configuring a GUI on a MFP from a device according to an embodiment of the invention.

FIG. 4 is a flow chart 400 illustrating the functional steps of configuring a GUI displayed on one or more MFPs 110 from device 120 according to an embodiment of the invention. In step 410, user interface specification data is received at device 120. User interface specification data is data that defines a desired display and operation behavior for a GUI displayed on a MFP. User interface specification data may define a compete set of display screens and behavior for each screen, or it may describe a customization to make to the display and/or operation behavior of an existing GUI.

An embodiment of user interface specification data is portrayed in FIG. 5. In the user interface specification data 500 depicted in FIG. 5, user interface specification data 500 includes one or more target addresses 510. A target address 510 is an addresses of a MFP intended to receive the user interface specification data in which the target address is located, e.g., an IP address. In other embodiments, additional components may be present in user interface specification data 500, which shall be described later.

In an embodiment, device 120 may receive user interface specification data by uploading the data from an external location, e.g., a database or a MFP. In another embodiment, device 120 may receive user interface specification data from a user that is manually configuring device 120 to store the user interface specification data. For example, a user may manually configure user interface specification data on device 120 using a text editor, and thereafter save the user interface specification data to the device 120 to cause the device to receive the user interface specification data. In another embodiment, device 120 may receive user interface specification data by (a) uploading the data from an external location, (b) thereafter storing the user interface specification data to device 120, and (c) storing customizations to the user interface specification data as configured by a user that is operating device 120 to cause the device 120 to receive the user interface specification data. After performing step 410, processing proceeds to step 412.

In step 412, user interface specification data is verified at device 120. In an embodiment, step 412 may be implemented by applying one or more rules against the user interface specification data to determine if the display and operation behavior of the GUI as defined by the user interface specification data is valid. For example, a rule may be defined to check the size and placement of the buttons to determine if the buttons may be displayed properly on the GUI. Any display component or operational behavior of the GUI may be checked by the one or more rules. If the verification performed in step 412 results in a determination that the user interface specification data presents a problem, then the user may be presented an opportunity to correct the problem. For example, if a problem is detected, processing may proceed back to step 410, wherein the user may be able to fix the problem by submitting a revised set of user interface specification data or modifying the existing user interface specification data through device 410. After the user interface specification data has been verified, processing proceeds to step 414. In an embodiment, step 412 is optional.

In step 414, the user interface specification data is transmitted to a MFP 110. User interface specification data is transmitted to the first MFP identified in the one or more target addresses 510 in the user interface specification data that has not received the user interface specification data. For example, if there were three MFPs identified in the one or more target addresses 510, then the first MFP identified in the target addresses 510 would be sent the user interface specification data in step 414 if that MFP had not previously been sent the user interface specification data. After performing the step 414, processing proceeds to step 416.

In step 416, user interface specification data is received at the MFP 110. Network interface 118 of the MFP receives the user interface specification data from communications link 130. After step 416 is performed at a MFP, processing for that MFP proceeds to step 418.

In step 418, user interface specification data is verified at the MFP 110. In an embodiment, step 418 may be implemented by applying one or more rules against the user interface specification data to determine if the display and operation behavior of the GUI as defined by the user interface specification data is valid. For example, a rule may be defined to check the size and placement of the buttons to determine if the buttons may be displayed properly on the GUI. Any display component or operational behavior of the GUI may be checked by the one or more rules. If the verification performed in step 418 results in a determination that the user interface specification data presents a problem, then the user may be afforded an opportunity to correct the problem. For example, if a problem is detected, processing may proceed back to step 424, wherein notification of the problem may be sent to device 120 to allow the user of device 120 an opportunity to correct the problem. After the user interface specification data has been verified at the MFP, processing proceeds to step 420. In an embodiment, step 418 is optional.

In step 420, the GUI as defined by the user interface specification data is displayed on the MFP. In an embodiment, update utility 114 updates the GUI displayed on the MFP to reflect the received user interface specification data. In an embodiment, step 420 is optional. After performing step 420 at a MFP, processing for that MFP proceeds to step 422.

In step 422, the user interface specification data is stored in storage 116. In an embodiment, update utility 114 may store the user interface specification data in storage 116. After performing step 422 at a MFP, processing for that MFP proceeds to step 424.

In step 424, the result of updating the GUI to reflect the user interface specification data at the MFP is transmitted to the device 120. For example, if the GUI was updated to reflect the user interface specification data without encountering any problems, then notice that no problems were encountered in updating the GUI at the MFP is transmitted to device 120; otherwise, an indication of what problem(s) were encountered in updating the GUI at the MFP is transmitted to device 120. After performing step 424 at a MFP, processing proceeds to step 426.

In step 426, a determination is made at device 120 as to whether the user interface specification data should be transmitted to another MFP. If more than one MFP was identified in the one or more target addresses 510 in the user interface specification data, then each MFP identified in the one or more target addresses 510 receives a copy of the user interface specification data. If a MFP is identified in the one or more target addresses 510 in the user interface specification data that has not already received the user interface specification data, then processing proceeds to step 414, wherein the user interface specification data is transmitted to the next MFP identified in the one or more target addresses 510 that has not already received the user interface specification data. If no additional MFPs are indicated in the one or more target addresses 510 to receive the user interface specification data, then processing proceeds to step 430.

In step 430, a result of updating the GUI of all MFPs updated is displayed at device 120. For example, if three MFPs were updated, then device 120 displays the results of updating the GUI across each of the three MFPs.

By following the steps illustrated in FIG. 4, one may use device 120 to update the GUI of multiple MFPs. The sequence of steps illustrated in FIG. 4 are merely illustrative, and embodiments of the invention are not limited to the exact sequence of steps shown in FIG. 4, as other embodiments may omit steps, performs steps in a different order, or perform steps in parallel. For example, in an embodiment, steps 412 and 418 are optional, and steps 420 and 422 may be performed in reverse order or in parallel.

Copying a GUI on a First MFP to One or More Second MFPs

Figure 6:
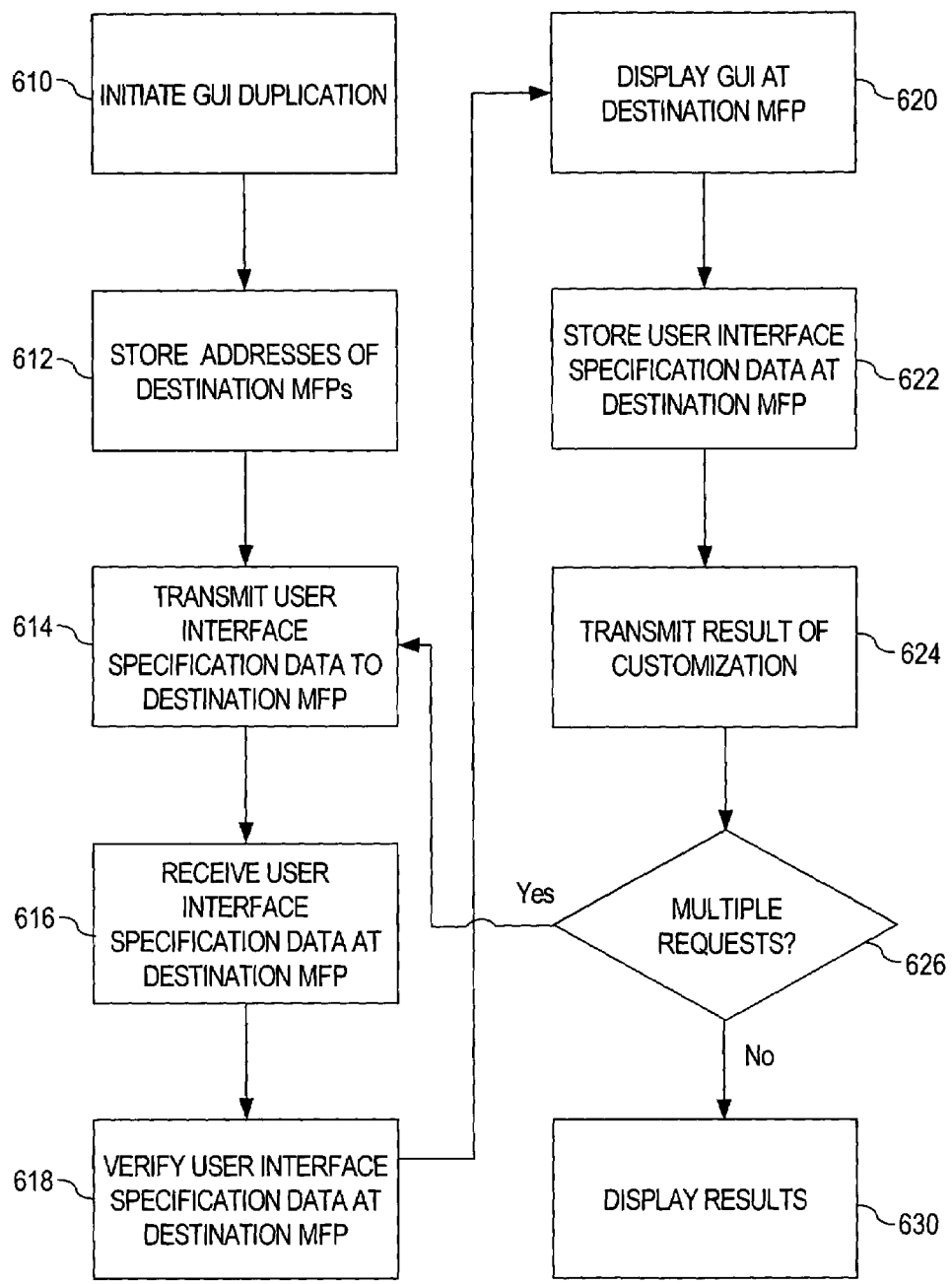
FIG. 6 is a flow chart illustrating the functional steps of copying a GUI on a first MFP to one or more second MFPs according to an embodiment of the invention.

FIG. 6 is a flow chart 600 illustrating the functional steps of copying a GUI ("the copied GUI") on a source MFP to one or more destination MFPs according to an embodiment of the invention. The functional steps illustrated in FIG. 6 will be explained with reference to FIG. 11B, which is a block diagram illustrating a customizable MFP system 100 that includes a source MFP 110A and a destination MFP 10B. For example, using the process illustrated in FIG. 6, GUI 112 of MFP 110A may be copied to GUI 112 of MFP 110B. While only one destination MFP is illustrated in FIG. 1B for clarity, the functional steps illustrated in FIG. 6 may be performed in conjunction with any number of destination MFPs.

In step 610, the process of copying the GUI of a source MFP to one or more destination MFPs is initiated. In an embodiment, step 610 may be performed by configuring a mechanism displayed on the source MFP 110A, such as pressing copy button 210 displayed on the GUIs depicted in FIGS. 2 and 3. In another embodiment, step 610 may be performed by configuring a mechanism displayed upon device 120. After step 610 is performed, processing proceeds to step 612.

Figure 7:
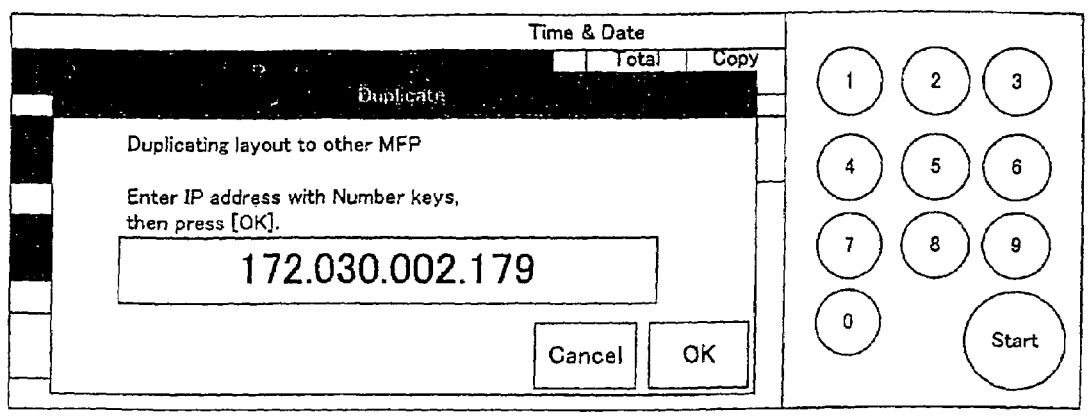
FIG. 7 is a pictorial representation of a GUI displayed on a MFP that is configured to receive an IP address associated with a destination MFP according to an embodiment of the invention.

In step 612, the address of the one or more destination MFPs are recorded. In an embodiment, step 612 may be performed by recording one or more IP addresses associated with each destination MFP. FIG. 7 is a pictorial representation of a GUI displayed on a MFP that is configured to receive an IP address associated with a destination MFP according to an embodiment of the invention. Other embodiments of the invention may store other types of address information besides an IP address, as long as the address information provides a way to locate the MFP such that subsequent communications may be transmitted to the MFP. After step 612 is performed, processing proceeds to step 614.

In step 614, user interface specification data is transmitted to a destination MFP identified in step 612. If more than one destination MFP was identified in step 612, then the next destination MFP that was identified in step 612 that has not received the copied GUI is transmitted the user interface specification data. In an embodiment, location data that identifies where step 610 was performed is also transmitted to the MFP identified in step 612, which enables the result of copying the GUI to be communicate back to the entity that performed step 610. For example, location data may identity a particular source MFP or a particular device 120.

The user interface specification data transmitted in step 614 is data that defines a desired display and operation behavior for the copied GUI. If step 610 is initiated at the source MFP, then the source MFP retrieves the user interface specification data for transmittal. If step 610 is initiated at device 120, then device 120 communicates with the source MFP to either (A) cause the source MFP to transmit the user interface specification data as explained above, or (B) retrieve the user interface specification data from the source MFP so that device 120 may transmit the user interface specification data as explained above. After step 614 is performed, processing proceeds to step 616.

In step 616, the user interface specification data is received at a destination MFP. After step 616 is performed, processing proceeds to step 618.

In step 618, user interface specification data is verified at the destination MFP. In an embodiment, step 618 may be implemented by applying one or more rules against the user interface specification data to determine if the display and operation behavior of the GUI as defined by the user interface specification data is valid. For example, a rule may be defined to check the size and placement of the buttons to determine if the buttons may be displayed properly on the GUI. Any display component or operational behavior of the GUI may be checked by the one or more rules. If the verification performed in step 618 results in a determination that the user interface specification data presents a problem, then the user may be afforded an opportunity to correct the problem. After the user interface specification data has been verified at the MFP, processing proceeds to step 620. In an embodiment, step 618 is optional.

In step 620, the GUI as defined by the user interface specification data is displayed on the destination MFP. In an embodiment, update utility 114 updates the GUI displayed on the destination MFP to reflect the received user interface specification data. In an embodiment, step 620 is optional. After performing step 620 at a MFP, processing for that MFP proceeds to step 622.

In step 622, the user interface specification data is stored in storage 116 at the destination MFP. In an embodiment, update utility 114 may store the user interface specification data in storage 116. After performing step 622 at a destination MFP, processing for that MFP proceeds to step 624.

In step 624, the result of updating the GUI to reflect the user interface specification data at the destination MFP is transmitted to the location identified in the location data transmitted to the MFP in step 614. For example, if the GUI was copied to reflect the user interface specification data at the destination MFP without encountering any problems, then notice that no problems were encountered in copying the GUI at the destination MFP is transmitted to location identified in the location data, e.g., the source MFP or device 120; otherwise, an indication of what problem(s) were encountered in copied the GUI at the destination MFP is transmitted to the location data, e.g., the source MFP or device 120. After performing step 624 at a MFP, processing proceeds to step 426.

In step 626, a determination is made as to whether the user interface specification data should be transmitted to another destination MFP that was identified in 612. If a destination MFP was identified in step 612 that has not already received the user interface specification data, then processing proceeds to step 614, wherein the user interface specification data is transmitted to the next destination MFP identified in step 612 that has not already received the user interface specification data. If no additional destination MFPs are indicated to receive the user interface specification data, then processing proceeds to step 630.

In step 630, a result of copying the GUI of the source MFP to all destination MFPs identified in step 612 is displayed. For example, if three MFPs were identified as destination MFPs in step 612, then the results of copying the GUI to each of the three MFPs is displayed. The results of step 630 are displayed at the same location in which step 610 was performed, i.e., if the process of FIG. 6 was initiated at device 120, then the results of step 630 are displayed at device 120, whereas if the process of FIG. 6 was initiated at the source MFP 110, then the results of step 630 are displayed at the source MFP 110.

By following the steps illustrated in FIG. 6, one may copy a GUI on a source MFP to one or more destinations MFPs. The sequence of steps illustrated in FIG. 6 are merely illustrative, and embodiments of the invention are not limited to the exact sequence of steps shown in FIG. 6, as other embodiments may omit steps, performs steps in a different order, or perform steps in parallel. For example, in an embodiment, step 618 is optional, and steps 620 and 622 may be performed in reverse order or in parallel.

Scheduling the Implementation of a GUI on a MFP

Embodiments of the invention may be used to schedule the customization of one or more GUIs, each of which is displayed on a MFP. An embodiment of user interface specification data is portrayed in FIG. 8. In the user interface specification data 800 depicted in FIG. 8, user interface specification data 800 includes scheduling data 810. Scheduling data 810 is data that defines a start time, wherein the start time is a point in time to update one or more GUIs to reflect the user interface specification data in which the scheduling data 810 resides. After the GUIs are updated to reflect the user interface specification data, the GUIs may remain updated indefinitely and need not be updated or changed again.

In another embodiments of the invention, scheduling data 810 further includes an end time, wherein the end time indicates a point in time to update one or more GUIs to cease reflecting the user interface specification data 800 in which the scheduling data 810 resides. The start time and end time may be specified to any degree of granularity, e.g., the start time or end time could be specified to a specific hour, minute, or second, e.g., 11:34 PM and 22 seconds.

Embodiments of the invention that employ scheduling data 810 in the user interface specification data 800 may perform the steps illustrated in FIGS. 4 and 6. Specifically, the user may specify the scheduling data 810 through a graphical user interface or similar mechanism, and store the user interface specification data 800 containing the scheduling data 810 at device 120 or at a source MFP.

In an embodiment, a MFP may receive user interface specification data 800 prior to the start time indicated in the scheduling data 810. In such an embodiment, when a MFP receives user interface specification data 800 that contains scheduling data 810, the MFP may determine the current time. In an embodiment, after determining the current time, if the current time is at least as recent as the start time indicated in the scheduling data 810, then the GUI at the MFP is updated to reflect the user interface specification data 800 in which the scheduling data 810 resides. In an embodiment, after determining the current time, if the current time is not as recent as the start time indicated in the scheduling data 810, then the current time is periodically checked at a configurable interval until the condition is satisfied. In an embodiment, if the current time is at least as recent as an end time that is defined in the scheduling data 810, then the GUI at the MFP is updated to cease reflecting the user interface specification data 800 in which the scheduling data 810 resides.

In another embodiment, the user interface specification data 800 containing the scheduling data 810 may not be transmitted until the start time indicated in the scheduling data 810. In such an embodiment, the device or MFP storing the user interface specification data 800 containing the scheduling data 810 may determine the current time. After determining the current time, if the current time is at least as recent as the start time indicated in the scheduling data 810, then the user interface specification data is transmitted to the MFP. In an embodiment, if the current time is at least as recent as an end time that is defined in the scheduling data 810, then a message is transmitted to each MFP indicating in the one or more target addresses 510 in the user interface specification data to cease reflecting the user interface specification data.

In an embodiment, when a GUI displayed on a MFP ceases to reflect a first set of user interface specification data, then the GUI may be restored to a prior version. The storage 116 of a MFP may store one or more versions of the GUI. When a GUI is updated, the prior version of the GUI may be stored in storage 116. Consequently, when the MFP receives a message indicating that the GUI should cease reflecting a set of user interface specification data, a prior version of the GUI may be presented by loading the user interface specification data associated with the prior version of the GUI that is stored in persistent storage.

Specifying a Use Limit for a MFP GUI

Embodiments of the invention may be used to specify a use limit for one or more GUIs, each of which is displayed on a MFP. A use limit defines a number of uses to apply the user interface specification data to one or more GUIs. An embodiment of user interface specification data is portrayed in FIG. 9. In the user interface specification data 900 depicted in FIG. 9, user interface specification data 900 includes use limit data 910. Use limit data 910 is data that indicates a use limit.

Embodiments of the invention that employ use limit data 910 in the user interface specification data may perform the steps illustrated in FIGS. 4 and 6. Specifically, the user may specify the use limit data 910 through a graphical user interface or similar mechanism, and store the user interface specification data 900 containing the use limit data 910 at device 120 or at a source MFP.

In an embodiment, when a MFP receives user interface specification data 900 that contains a use limit data 910, the MFP may maintains a number of current uses for the GUI. The number of uses associated with the GUI corresponds to the number of unique operations performed through the GUI. For example, the first operation performed through the GUI is the first use, and the tenth operation performed through the GUI is the tenth use. An operation may be a discrete transaction that the MFP may perform, e.g., a copy job and a printing job.

In an embodiment, if the number of current uses is greater than or equal to use limit defined in the use limit data 910, then the GUI at the MFP is updated to cease reflecting the user interface specification data 900 in which the use limit data 910 resides.

In an embodiment, when a GUI displayed on a MFP ceases to reflect a first set of user interface specification data, then the GUI may be restored to a prior version. The storage 116 of a MFP may store one or more versions of the GUI. When a GUI is updated, the prior version of the GUI may be stored in storage 116. Consequently, when the MFP receives a message indicating that the GUI should cease reflecting a set of user interface specification data, a prior version of the GUI may be presented by loading the user interface specification data associated with the prior version of the GUI that is stored in persistent storage.

Implementing Mechanisms

Figure 10:
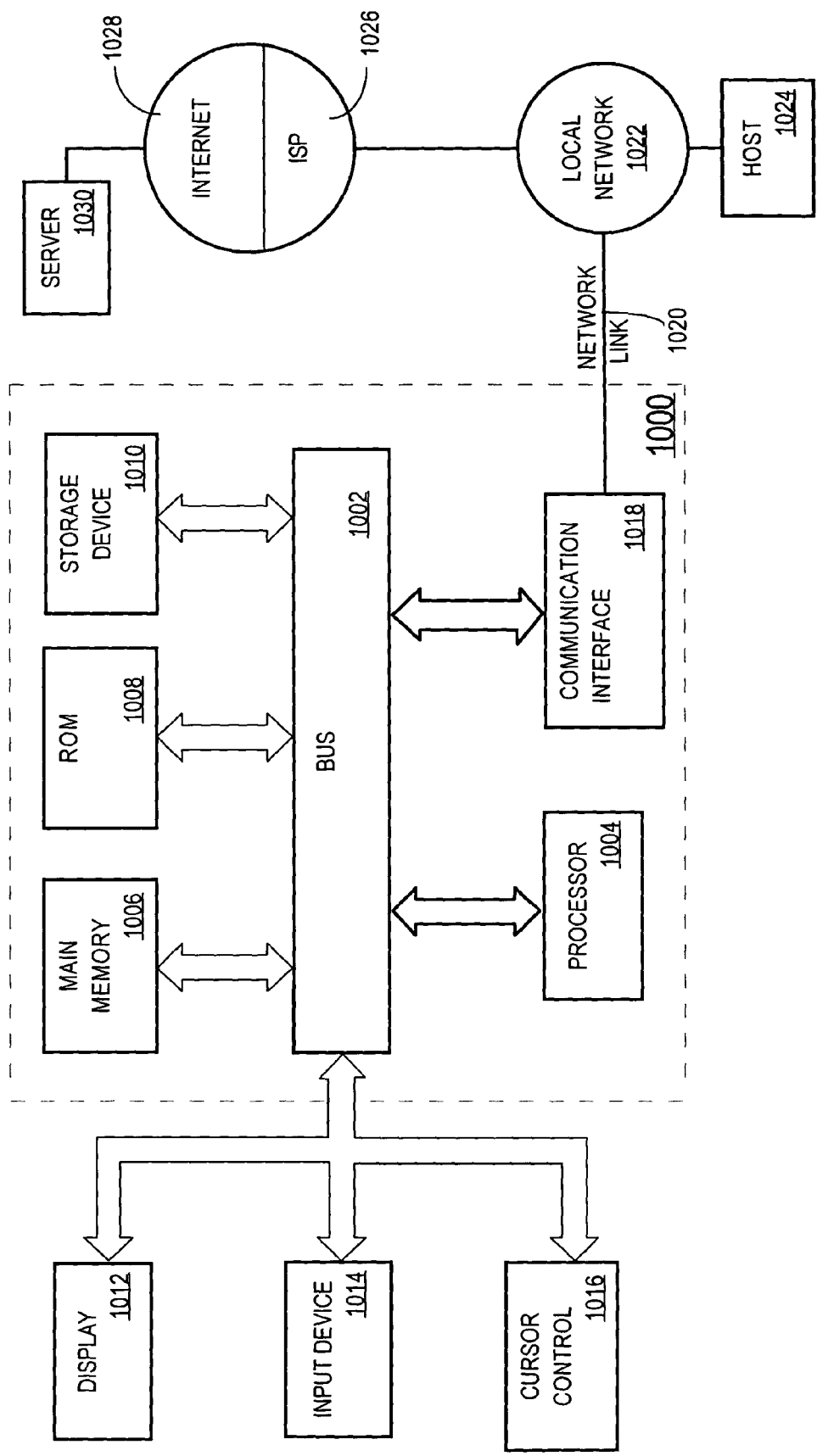
FIG. 10 is a block diagram that illustrates a computer system upon which an embodiment of the invention may be implemented.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 904. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example; a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution. In this manner, computer system 1000 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for copying a configuration of a source user interface to one or more destination user interfaces, comprising:
    retrieving user interface specification data that defines a display and operation behavior for the source user interface, wherein the source user interface is located at a source multifunction peripheral;
    transmitting the user interface specification data to one or more destination multifunction peripherals, wherein each of the one or more destination multifunction peripherals contains a destination user interface of the one or more destination user interfaces; and
    updating each of the one or more destination user interfaces to reflect the user interface specification data.

2. The method of claim 1, further comprising receiving result data that defines whether at least one of the one or more destination user interfaces was updated to reflect the user interface specification data.

3. The method of claim 2, further comprising displaying the result data at a wireless device, the source multifunction peripheral, or one of the one or more destination multifunction peripherals.

4. The method of claim 1, wherein the step of transmitting the user interface specification data is initiated at the source multifunction peripheral.

5. The method of claim 1, wherein the step of transmitting the user interface specification data is initiated at one or more of: a personal computer, a personal digital assistant, a cellular phone, a wireless device, and a network terminal.

6. The method of claim 1, further comprising:
    at the one or more destination multifunction peripherals, determining whether the received user interface specification data satisfies a set of rules.

7. The method of claim 1, further comprising:
    updating a set of data that determines a display and operation behavior for at least one of the one or more destination user interfaces to reflect the received user interface specification data.

8. The one or more computer-readable storage media carrying one or more sequences of instructions for copying a configuration of a source user interface to one or more destination user interfaces, wherein execution of the one or more sequences of instructions by one or more processors causes the one or more processors to perform the steps of:
    retrieving user interface specification data that defines a display and operation behavior for the source user interface, wherein the source user interface is located at a source multifunction peripheral;
    transmitting the user interface specification data to one or more destination multifunction peripherals, wherein each of the one or more destination multifunction peripherals contains a destination user interface of the one or more destination user interfaces; and
    updating each of the one or more destination user interfaces to reflect the user interface specification data.

9. The one or more computer-readable storage media of claim 8, wherein execution of the one or more sequences of instructions by one or more processors further causes the one or more processors to perform the step of:
    receiving result data that defines whether at least one of the one or more destination user interfaces was updated to reflect the user interface specification data.

10. The one or more computer-readable storage media of claim 9, wherein execution of the one or more sequences of instructions by one or more processors further causes the one or more processors to perform the step of:
displaying the result data at either a wireless device, the source multifunction peripheral, or one of the one or more destination multifunction peripherals.

11. The one or more computer-readable storage media of claim 8, wherein the step of transmitting the user interface specification data is initiated at the source multifunction peripheral.

12. The one or more computer-readable storage media of claim 8, wherein the step of transmitting the user interface specification data is initiated at one or more of: a personal computer, a personal digital assistant, a cellular phone, a wireless device, and a network terminal.

13. The one or more computer-readable storage media of claim 8, wherein execution of the one or more sequences of instructions by one or more processors further causes the one or more processors to perform the step of:
at the one or more destination multifunction peripherals, determining whether the received user interface specification data satisfies a set of rules.

14. The one or more computer-readable storage media of claim 8, wherein execution of the one or more sequences of instructions by one or more processors further causes the one or more processors to perform the step of:
updating a set of data that determines a display and operation behavior for at least one of the one or more destination user interfaces to reflect the received user interface specification data.

15. An apparatus for copying a configuration of a source user interface to one or more destination user interfaces, comprising:
one or more processors;
a computer-readable medium accessible to the one or more processors and comprising one or more sequences of instructions which, when executed by the one or more processors, cause the one or more processors to perform the steps of:
retrieving user interface specification data that defines a display and operation behavior for the source user interface, wherein the source user interface is located at a source multifunction peripheral;
transmitting the user interface specification data to one or more destination multifunction peripherals, wherein each of the one or more destination multifunction peripherals contains a destination user interface of the one or more destination user interfaces; and
updating each of the one or more destination user interfaces to reflect the user interface specification data.

16. The apparatus of claim 15, wherein execution of the one or more sequences of instructions by the one or more processors further causes the one or more processors to perform the step of:
receiving result data that defines whether at least one of the one or more destination user interfaces was updated to reflect the user interface specification data.

17. The apparatus of claim 16, wherein execution of the one or more sequences of instructions by the one or more processors further causes the one or more processors to perform the step of:
displaying the result data at either a wireless device, the source destination multifunction peripheral, or one of the one or more destination multifunction peripherals.

18. The apparatus of claim 15, wherein the step of transmitting the user interface specification data is initiated at the source multifunction peripheral.

19. The apparatus of claim 15, wherein the step of transmitting the user interface specification data is initiated at one or more of: a personal computer, a personal digital assistant, a cellular phone, a wireless device, and a network terminal.

20. The apparatus of claim 15, wherein execution of the one or more sequences of instructions by the one or more processors further causes the one or more processors to perform the step of:
at the one or more destination multifunction peripherals, determining whether the received user interface specification data satisfies a set of rules.

21. The apparatus of claim 15, wherein execution of the one or more sequences of instructions by the one or more processors further causes the one or more processors to perform the step of:
updating a set of data that determines a display and operation behavior for at least one of the one or more destination user interfaces to reflect the received second set of user interface specification data.

22. An apparatus for copying a configuration of a source user interface to one or more destination user interfaces, comprising:
means for retrieving user interface specification data that defines a display and operation behavior for the source user interface, wherein the source user interface is located at a source multifunction peripheral;
means for transmitting the user interface specification data to one or more destination multifunction peripherals, wherein each of the one or more destination multifunction peripherals contains a destination user interface of the one or more destination user interfaces; and
means for updating each of the one or more destination user interfaces to reflect the user interface specification data.

23. The apparatus of claim 22, further comprising:
means for receiving result data that defines whether at least one of the one or more destination user interfaces was updated to reflect the user interface specification data.

24. The apparatus of claim 23, further comprising:
means for displaying the result data at a wireless device, the source multifunction peripheral, or one of the one or more destination multifunction peripherals.

25. The apparatus of claim 22, wherein the means for transmitting the user interface specification data initiates the transmission at the source multifunction peripheral.

26. The apparatus of claim 22, wherein the means for transmitting the user interface specification data initiate the transmission at one or more of: a personal computer, a personal digital assistant, a cellular phone, a wireless device, and a network terminal.

27. The apparatus of claim 22, further comprising:
means for determining whether the received user interface specification data satisfies a set of rules at the one or more second multifunction peripherals.

28. The apparatus of claim 22, further comprising:
means for updating a set of data that determines a display and operation behavior for at least one of the one or more destination user interfaces to reflect the received user interface specification data.

* * * * *